(12) United States Patent
Ushidate (10) Patent No.: US 9,096,338 B2
(45) Date of Patent: Aug. 4, 2015

(54) FILM FITTING SYSTEM

(75) Inventor: Toshiyuki Ushidate, Habikino (JP)

(73) Assignee: FUJI SEAL INTERNATIONAL, INC., Osaka (JP)

( * ) Notice: Subject to any disclaimer, the term of this patent is extended or adjusted under 35 U.S.C. 154(b) by 685 days.

(21) Appl. No.: 13/390,831

(22) PCT Filed: Aug. 20, 2009

(86) PCT No.: PCT/JP2009/064583
§ 371 (c)(1),
(2), (4) Date: Mar. 1, 2012

(87) PCT Pub. No.: WO2011/021295
PCT Pub. Date: Feb. 24, 2011

(65) Prior Publication Data
US 2012/0167525 A1 Jul. 5, 2012

(51) Int. Cl.
*B65C 3/14* (2006.01)
*B65C 9/26* (2006.01)
*B65B 53/00* (2006.01)
(Continued)

(52) U.S. Cl.
CPC ............... *B65C 3/065* (2013.01); *B29C 63/423* (2013.01); *B65B 9/14* (2013.01); *B65C 9/06* (2013.01); *B65G 47/846* (2013.01)

(58) Field of Classification Search
CPC ............ B65C 3/14; B65C 9/26; B65B 53/00; B65B 9/00; B65B 11/00
USPC ........ 53/137.2, 209, 292, 399, 441, 556, 582, 53/585; 156/349, 417, 419, DIG. 5
See application file for complete search history.

(56) References Cited

U.S. PATENT DOCUMENTS 3,888,067 A * 6/1975 Cross et al. ...................... 53/292
4,104,845 A * 8/1978 Hoffmann ....................... 53/410
(Continued)

FOREIGN PATENT DOCUMENTS

| EP | 1 091 877 B1 | 5/2005 |
|---|---|---|
| JP | A-52-91264 | 8/1977 |

(Continued)

OTHER PUBLICATIONS

Mar. 13, 2012 International Preliminary Report on Patentability issued in International Patent Application No. PCT/JP2009/064583 (with translation).

(Continued)

*Primary Examiner* — Thanh Truong
*Assistant Examiner* — Praachi M Pathak
(74) *Attorney, Agent, or Firm* — Oliff PLC (57) ABSTRACT

A film fitting system which fits a tubular film on a fitting target including a fitting device which fits, at a predefined fitting position, the tubular film on the fitting target which is transported; and a transporting device which receives the fitting target at a predefined supplying position, wherein the transporting device includes a mount which is moved in a state where the fitting target is placed thereon; a positioning member which is moved in a linked manner with the mount and which positions the fitting target with respect to the mount by contacting a part of the fitting target; and a moving device which moves the positioning member to a reference position, and a retracted position where the positioning member is separated from the fitting target at least at the fitting position.

6 Claims, 8 Drawing Sheets

(51) Int. Cl.
- *B65B 9/00* (2006.01)
- *B65B 11/00* (2006.01)
- *B65C 3/06* (2006.01)
- *B29C 63/42* (2006.01)
- *B65B 9/14* (2006.01)
- *B65C 9/06* (2006.01)
- *B65G 47/84* (2006.01)

(56) References Cited

U.S. PATENT DOCUMENTS

| | | | | |
|---|---|---|---|---|
| 4,184,309 | A * | 1/1980 | Amberg | 53/399 |
| 4,208,237 | A * | 6/1980 | Heyne | 156/446 |
| 4,286,421 | A * | 9/1981 | Fujio | 53/399 |
| 4,481,064 | A * | 11/1984 | Westlund et al. | 156/351 |
| 4,662,148 | A * | 5/1987 | Nilsson | 53/399 |
| 4,694,633 | A * | 9/1987 | Fujio et al. | 53/49 |
| 5,417,794 | A * | 5/1995 | Menayan | 156/362 |
| 5,879,496 | A * | 3/1999 | Bright et al. | 156/86 |
| 6,016,641 | A * | 1/2000 | Nagano | 53/298 |
| 6,048,423 | A * | 4/2000 | Barrash et al. | 156/86 |
| 6,066,223 | A * | 5/2000 | Gomes et al. | 156/215 |
| 6,328,832 | B1 * | 12/2001 | Otruba et al. | 156/64 |
| 6,436,330 | B1 * | 8/2002 | Winter | 264/509 |
| 6,450,230 | B1 * | 9/2002 | Otruba | 156/566 |
| 6,581,751 | B1 | 6/2003 | Nickey et al. | |
| 6,793,755 | B2 * | 9/2004 | Schaupp et al. | 156/215 |
| 6,978,819 | B2 * | 12/2005 | Tanaka et al. | 156/566 |
| 7,060,143 | B1 * | 6/2006 | Eiban et al. | 156/86 |
| 7,875,143 | B2 * | 1/2011 | Kontz | 156/215 |
| 8,408,268 | B2 * | 4/2013 | Kontz | 156/568 |
| 2006/0213607 | A1 | 9/2006 | Eiban et al. | |
| 2013/0213579 | A1 * | 8/2013 | Pedercini et al. | 156/538 |

FOREIGN PATENT DOCUMENTS

| | | |
|---|---|---|
| JP | B2-5-30691 | 5/1993 |
| JP | A-7-40950 | 2/1995 |
| JP | A-2000-238726 | 9/2000 |
| JP | A-2002-206993 | 7/2002 |
| JP | A-2002-293311 | 10/2002 |
| JP | A-2004-203454 | 7/2004 |
| JP | A-2006-143262 | 6/2006 |

OTHER PUBLICATIONS

Jan. 30, 2013 European Search Report issued in European Patent Application No. EP 09 84 8492.

Oct. 13, 2009 International Search Report issued in International Patent Application No. PCT/JP2009/064583 (with translation).

Japanese Office Action issued in Japanese Patent Application No. 2011-527525 on Jun. 11, 2013 (with partial translation).

* cited by examiner

FILM FITTING SYSTEM

TECHNICAL FIELD

The present invention relates to a film fitting system for fitting a tubular film on a fitting target such as a bottle or a plastic bottle.

BACKGROUND ART

Conventionally, a film fitting system which fits a tubular film such as a shrink label on an outer peripheral surface of a body of a fitting target is known (see, for example, Patent Literature 1). Normally, such a film fitting system comprises a fitting device which fits the tubular film on the fitting target, and a transporting device which transports the fitting target to an operation position (fitting position) of the fitting device.

The fitting device opens a tubular film which is folded in an elongated band shape to form a tubular shape, and then lowers the opened tubular film toward the transported fitting target, so that the film is fitted onto the fitting target. In addition, the transporting device comprises a mount on which a plurality of fitting targets are placed, and transports the fitting targets to the fitting position through operations such as rotating the mount.

Here, generally, in the fitting device, the lowering position for the tubular film or the like is determined under the assumption that each fitting target is placed on a placement position which is set on the mount. In other words, if the fitting target is deviated from the predefined placement position, the tubular film which is being lowered and the fitting target would interfere with each other, and a problem results that the fitting target cannot be accurately fitted.

In consideration of this, in the related art, there is proposed a technique in which a positioning recess (pocket) is provided on the mount, to thereby position the fitting target. The pocket is a recess formed on the mount according to the shape of the fitting target, and is set such that the fitting target is placed at an appropriate position by the fitting target contacting a side surface of the pocket. In addition, there is also proposed another technique in which a clamp mechanism which clamps the fitting target at the placement position is provided. With the use of such techniques, the relative positional relationship between the tubular film and the fitting target is accurately maintained, and accurate fitting operation is enabled.

RELATED ART REFERENCES

Patent Literature

[Patent Literature 1] JP 2000-238726 A

DISCLOSURE OF INVENTION

Technical Problem

However, the clamp mechanism would make the structure complicated, causing problems such as complexity of the device, increased size, and increased cost. On the other hand, although a pocket can be relatively easily formed, because the shape of the pocket cannot be changed, the mount must be suitably replaced according to the shape of the fitting target to be used, and, thus, there is a problem in that such a configuration has low versatility. Moreover, when the fitting target is positioned using the pocket, a lower end of the fitting target is stored in the pocket. In this case, depending on the structure of the fitting device, there have been problems such as the fitting device and the pocket interfering with each other or that the tubular film cannot be lowered to a position near the lower end of the fitting target.

In view of the above, an advantage of the present invention is further simplification of a structure of a film fitting system which executes an accurate fitting operation.

Solution to Problem

According to one aspect of the present invention, there is provided a film fitting system which fits a tubular film on a fitting target, comprising a fitting device which fits, at a predefined fitting position, a tubular film on the fitting target which is transported, and a transporting device which receives the fitting target at a predefined supplying position, and then transports the fitting target via the fitting position to a sending position where the fitting target is sent to the outside, wherein the transporting device comprises a mount which is moved in a state where the fitting target is placed thereon, to move the fitting target from the supplying position via the fitting position to the sending position, a positioning member which moves in a linked manner with the mount and which positions the fitting target with respect to the mount by contacting a part of the fitting target, and a moving device which moves the positioning member to a reference position where the fitting target can be positioned at least at the supplying position, and a retracted position where the positioning member is separated from the fitting target at least at the fitting position.

According to another aspect of the present invention, preferably, the film fitting system further comprises a reference position changing unit which changes the reference position according to a type of the fitting target to be transported. According to another aspect of the present invention, preferably, in the film fitting system, a surface, of the positioning member, opposing the fitting target is cut out in an approximate V shape.

According to another aspect of the present invention, preferably, in the film fitting system, when the fitting device sucks and holds, with a plurality of sucking members, two opposing outer surfaces of the tubular film that are folded in a band shape, then moves opposing sucking members of the plurality of sucking members away from each other to open the tubular film, and lowers the sucking member in this state to fit the tubular film on the fitting target, the retracted position is a position where interference between the positioning member and the fitting device which is being lowered can be avoided.

According to another aspect of the present invention, preferably, in the film fitting system, the moving device comprises a first elastic element which biases the positioning member in a direction toward the reference position; a stopping member which directly or indirectly contacts the positioning member which is moved by the biasing force of the first elastic element, to stop the positioning member at the reference position; a movable lever which can oscillate; a pressing member which presses the movable lever to press the positioning member against the biasing force of the first elastic element and in a direction toward the retracted position; and a second elastic element which biases the movable lever in a direction to release the pressing when the pressing by the pressing member is released, wherein the pressing member presses the movable lever at least at the fitting position, and releases the pressing of the movable lever positioned at least at the supplying position. In this case, it is desirable to have a reference position changing unit which changes the reference position by adjusting the position of the stopping member.

Advantageous Effects of Invention

According to various aspects of the present invention, because the positioning member moves to the reference position where the fitting target can be positioned at least at the supplying position and to the retracted position separated from the fitting target at least at the fitting position, the positioning member does not obstruct the fitting device. As a result, the fitting operation can be accurately executed despite the structure being simple.

BEST MODE FOR CARRYING OUT THE INVENTION

Figure 1:
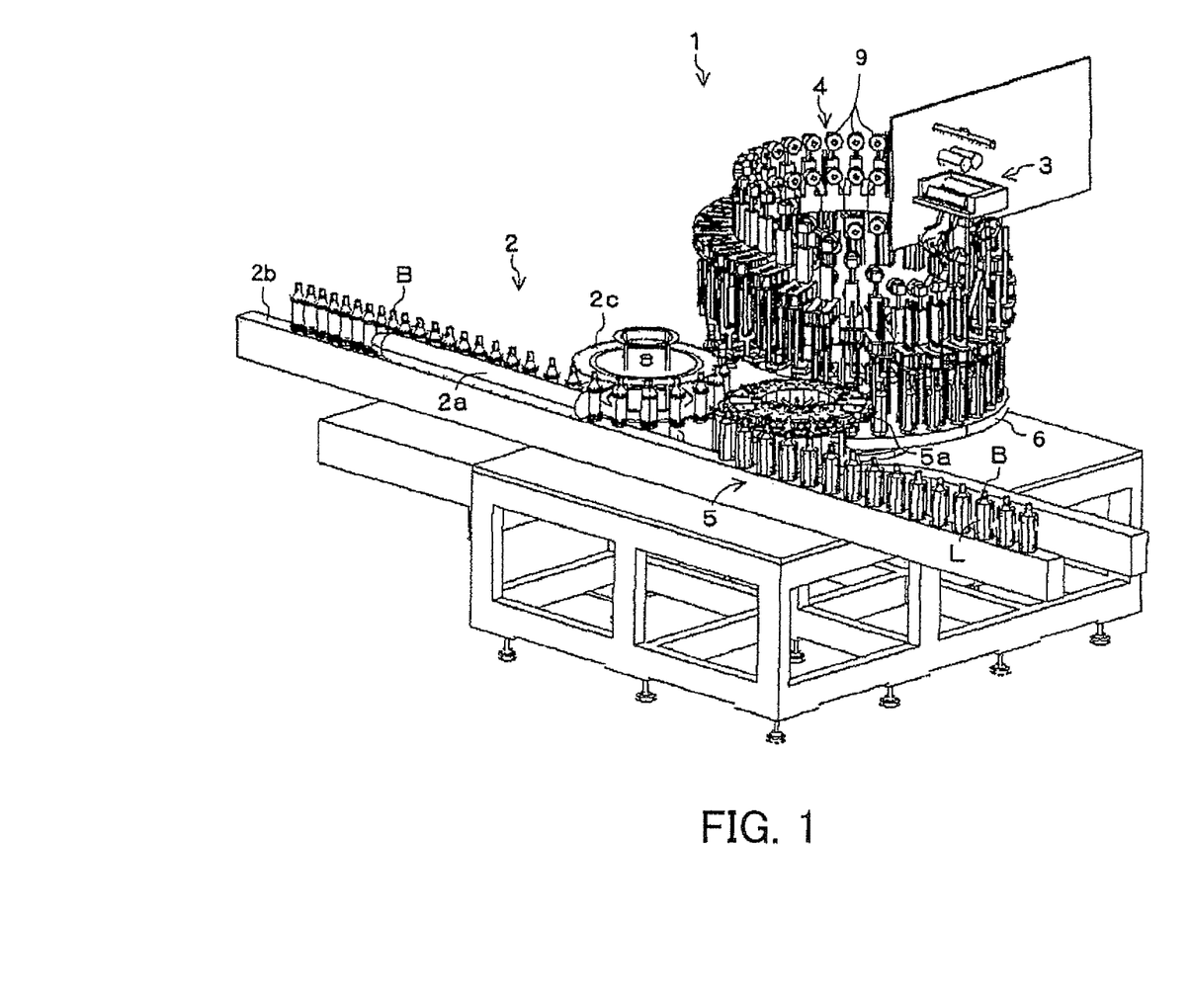
FIG. 1 is a schematic perspective diagram of a film fitting system according to a preferred embodiment of the present invention.
Figure 2:
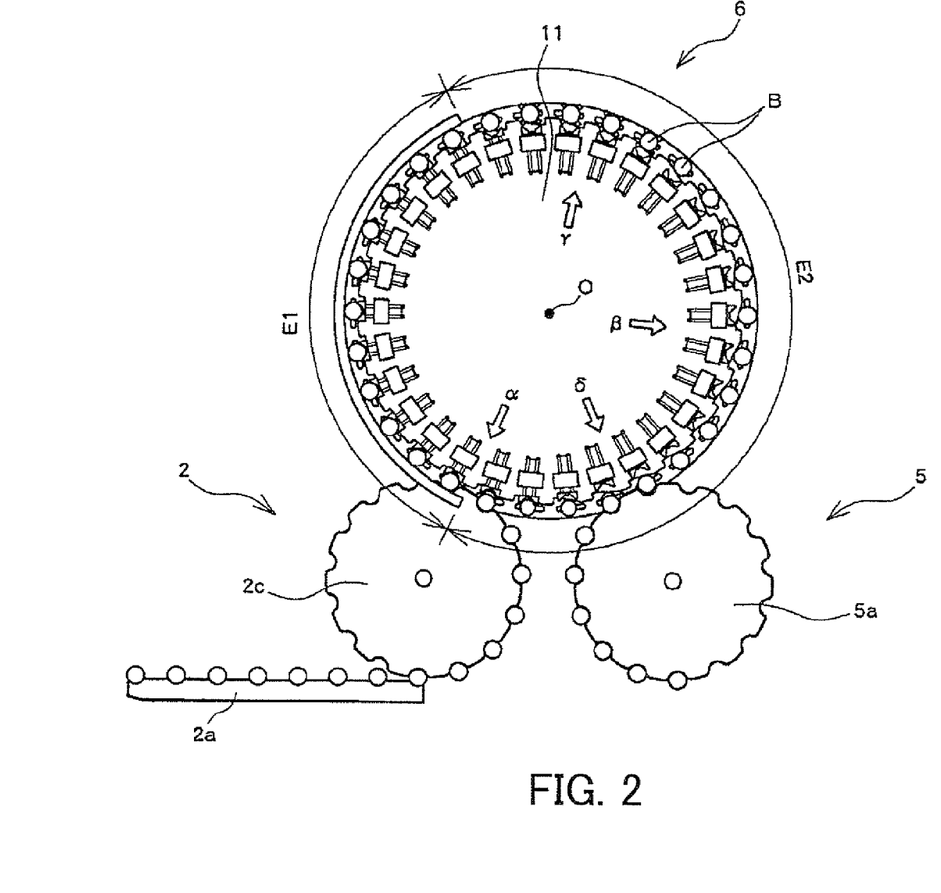
FIG. 2 is a schematic top view of a film fitting system.

A preferred embodiment of the present invention will now be described with reference to the drawings. FIG. 1 is a schematic perspective diagram of a film fitting system 1 according to a preferred embodiment of the present invention. FIG. 2 is a schematic top view of the film fitting system 1 (although a label supplying device 3 and a fitting device 4 are not shown in this diagram).

The film fitting system 1 is a system which fits a shrink label (hereinafter referred to as a "label L") which is a tubular film on a body of a fitting target (hereinafter referred to as a "bottle B"). No particular limitation is imposed on the type of the bottle B which is the fitting target, so long as the bottle B is a bottle-shaped container such as a bottle or a plastic bottle. The label L is a heat-shrinkable film formed in a tubular shape, and is mounted on the body of the bottle by being heated in a state where the label L is fitted on the bottle B.

In the film fitting system 1, the bottle B is supplied from an upstream-side system (not shown) to a bottle supplying device 2. The bottle supplying device 2 comprises a belt conveyer 2b, a screw 2a, a star wheel 2c, or the like, and supplies the bottle B supplied from the upstream-side system to a bottle transporting device 6.

After the bottle transporting device 6 receives at a predefined supplying position α the bottle B before the film is fitted, the bottle transporting device 6 transports the bottle B along an approximately circular transport route to a sending position δ, and sends the bottle B to a bottle sending device 5, such as comprising a star wheel 5a. The bottle sending device 5 sends the bottle B received from the bottle transporting device 6 to a downstream-side system (not shown).

When the bottle transporting device 6 transports the bottle B from the supplying position α to the sending position δ, the bottle B is transported always via a fitting position γ. The fitting position γ is a position where the label L is fitted on the bottle B by the fitting device 4. The fitting device 4 is a device which opens the label L which is folded in a band shape and then lowers the label L toward the bottle B, to fit the label L on the body of the bottle. The label L handled by the fitting device 4 is supplied from the label supplying device 3. The label supplying device 3 sequentially cuts the label L folded in an elongated band shape to an appropriate length, and supplies the label L to the fitting device 4 at a delivery position β.

When the label L is fitted on the bottle B, the fitting device 4 holds the label L with sucking rods 60A, 60B, 60C, and 60D (hereinafter, when the four rods are not distinguished from each other, the reference letter will be omitted, and the structure will be simply referred to as "sucking rods 60"). By lowering the label L together with the sucking rods 60, the fitting device 4 fits the label L on the bottle B. In this process, in order to appropriately execute the fitting operation, a relative positional relationship between the sucking rods 60 equipped in the fitting device 4 and the bottle B transported by the bottle transporting device 6 must be set in a predefined positional relationship. In other words, if the relative positional relationship between the sucking rods 60 and the bottle B is deviated from a predefined relationship, as the sucking rods 60 are lowered, the sucking rods 60 and the label L held by the sucking rods 60 would interfere with the bottle B, and problems would be caused such as degradation and damage of the bottle B and the label L. In particular, in the case of a relatively thin label L; for example, a thin label made of a film of 20 μm~40 μm, because the strength is low, the end of the label L may be bent even with a slight contact. In order to avoid such a problem, in the present embodiment, a structure for appropriately positioning the bottle B which is being transported is provided on the bottle transporting device 6. In the following, the structure of the sections of the film fitting system 1 will be described mainly centered around the bottle transporting device 6.

Figure 3:
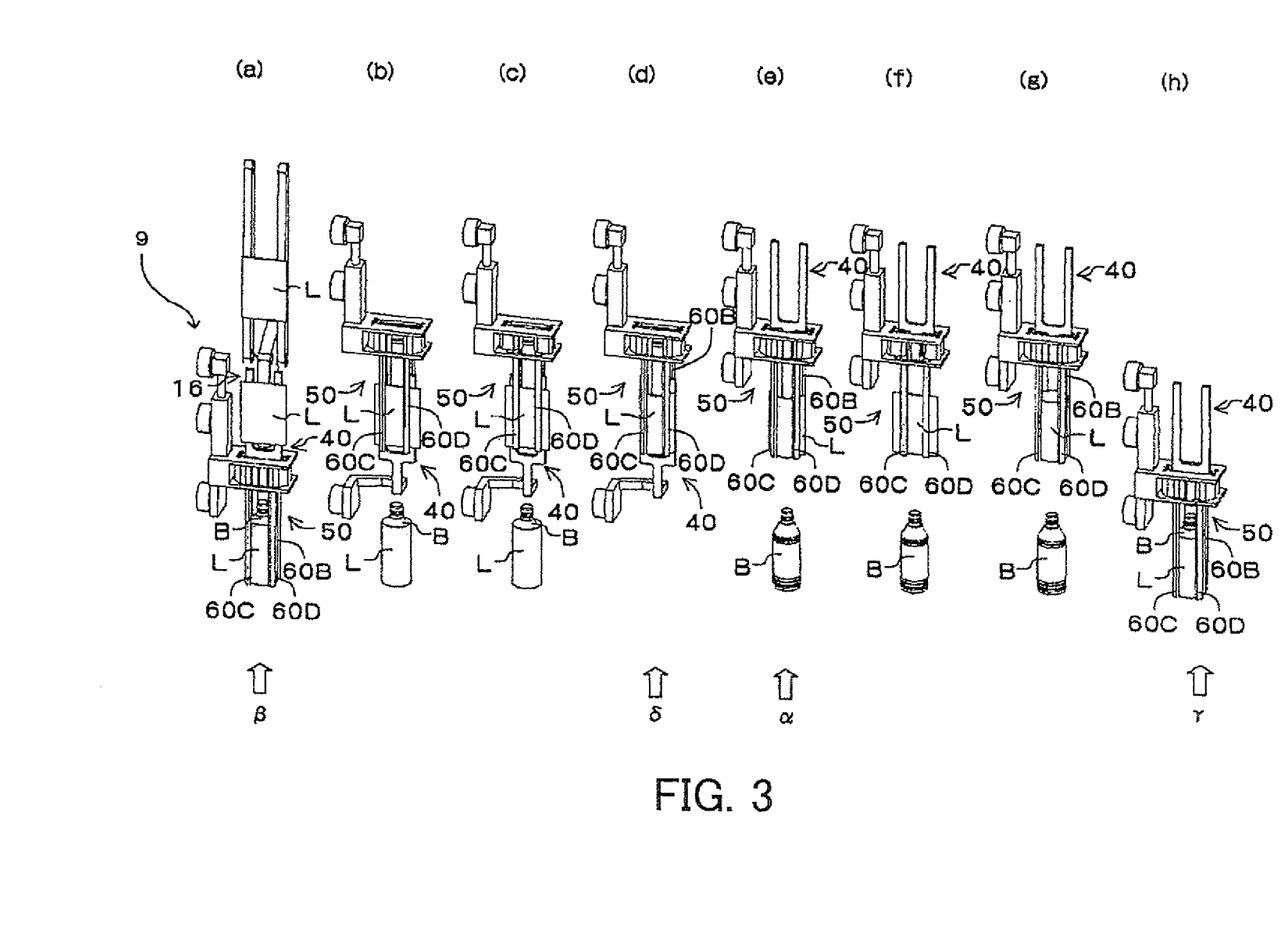
FIG. 3 is a diagram showing a flow of a label fitting operation performed by a fitting device.
Figure 4:
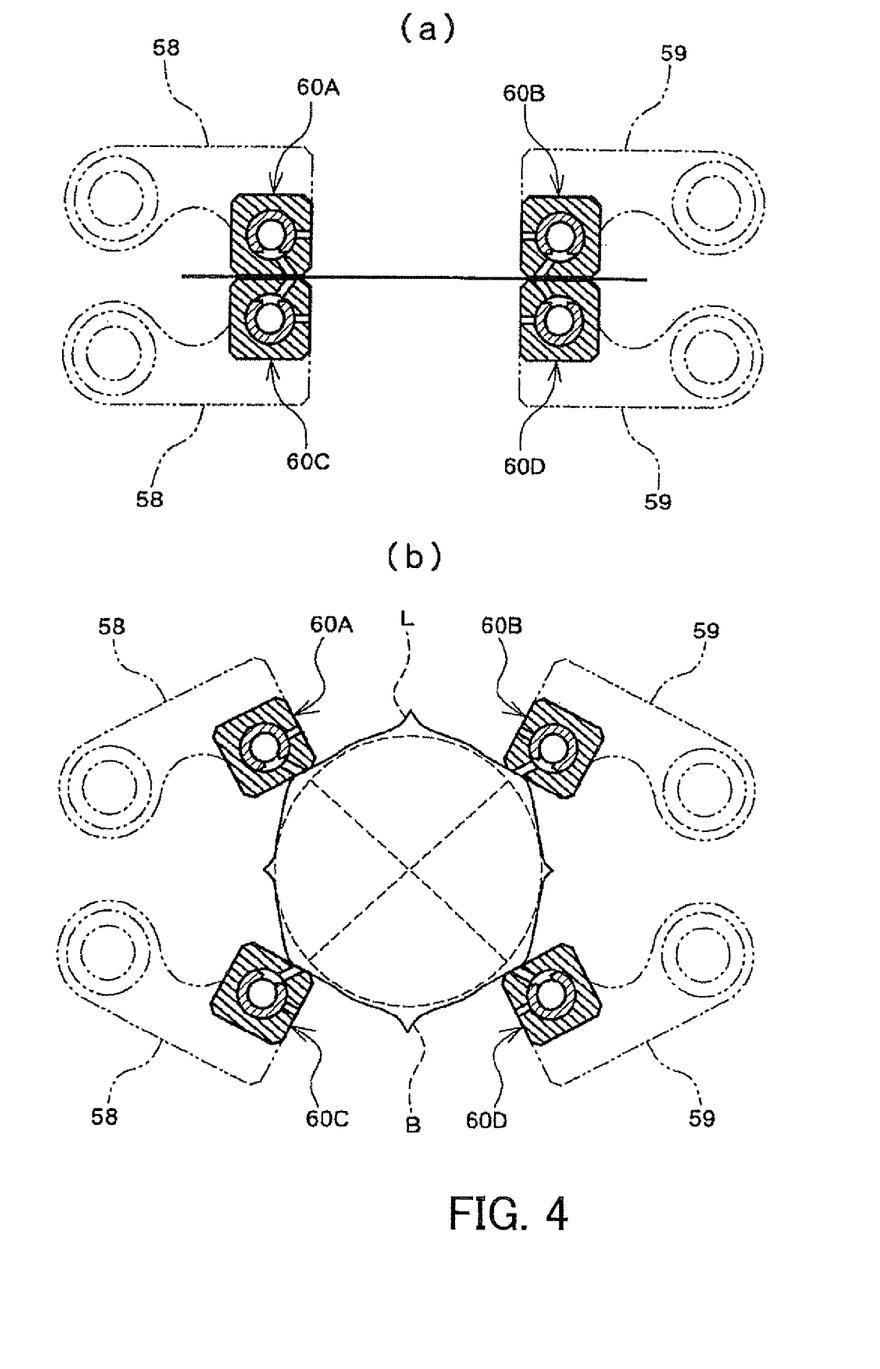
FIG. 4 is a top view of the vicinity of a label opener.

Before the structure of the bottle transporting device 6 is described, the structure of the fitting device 4 will be briefly described with reference to FIGS. 1, 3, and 4. FIG. 3 is a diagram showing a flow of fitting the label L on the bottle B in the fitting device 4, and FIG. 4 is a schematic top view of the vicinity of a label opener 50.

As shown in FIG. 1, the fitting device 4 has a plurality of fitting heads 9 which are provided in a circular shape. The plurality of fitting heads 9 are configured to rotate with the bottle 13 positioned immediately below the fitting head 9 (more precisely, a mount 10 on which the bottle B is placed). Each fitting head 9 receives the label L which is folded in a band shape from the label supplying device 3 at the label delivery position β, and then opens the received label L and fits the label L on the body of the bottle B before the bottle B reaches the sending position δ.

As shown in FIG. 3, each fitting head 9 has a take-up member 40 which receives the label L from the label supplying device 3, and a label opener 50 which holds and opens the label L. The take-up member 40 is a member having an approximate U shape viewed from the front, and a plurality of sucking holes for sucking and holding the label L are formed on a surface of the take-up member 40. The take-up member 40 can be raised and lowered.

The label opener 50 is a unit which holds the label L received from the take-up member 40 and opens the label L. The label opener 50 has two pairs of; that is, a total of four, sucking rods 60 which are placed opposing each other. As shown in FIG. 4, the four sucking rods 60 are held on arms 58 and 59, each of which is rotatable about a rotational axis. With the rotation of the arms 58 and 59, the pair of opposing sucking rods 60 can be moved away from or closer to each other.

On a surface of each sucking rod 60, a plurality of sucking holes are formed, so that the label L can be sucked and held. When the label L is opened, opposing outer side surfaces of the folded label L are held by the four sucking rods 60, and then, in this state, the opposing sucking rods 60 are moved in a direction away from each other. The four sucking rods 60 can be raised and lowered, so that the sucking rod 60 may be lowered while the label L is opened, to fit the label on the bottle B.

The flow of the label fitting by the fitting device 4 will now be briefly described. First, when the fitting head 9 passes through the label delivery position β, the take-up member 40 receives the label L supplied from the label supplying device 3 (refer to FIG. 3(a)). That is, the label L is set in a state where the label L is sucked and held on the surface of the take-up member 40. Meanwhile, on the bottle B positioned immediately below the fitting head 9, the label L which is previously supplied is fitted. The four sucking rods 60 which have been lowered for the previous fitting operation are released from sucking the label L, and are separated from the label L.

After this state is set, the four sucking rods 60 are then raised to a height approximately equal to that of the take-up member 40 (refer to FIG. 3(b)). With this process, the take-up member 40 and the label L are positioned between sucking rods 60 which oppose each other.

Then, as shown in FIG. 3(c), the label sucking by the sucking rods 60 at an opposite side of the take-up member 40 (that is, two sucking rods 60C and 60D positioned at the near side in FIG. 3(c)) is started for the label L. Then, the label sucking by the take-up member 40 is released so that the label L is handed from the take-up member 40 to the sucking rods 60.

After the label L is handed to the sucking rods 60, the arms 58 and 59 are rotated, to move the sucking rods 60 away from the take-up member 40 (refer to FIG. 3(d)). Then, the take-up member 40 is raised so that only the label L is present between the opposing sucking rods 60 (refer to FIG. 3(e)).

When this state is achieved, the arms 58 and 59 are rotated to cause the opposing sucking rods 60 to move close to each other (refer to FIG. 3(f)). In other words, the label L is sandwiched by the opposing sucking rods 60. Then, the sucking of the label L by all of the four sucking rods 60 is started.

When the label L is sucked by all of the four sucking rods 60, the arms 58 and 59 are again rotated to move the opposing sucking rods 60 away from each other (refer to FIG. 3(g)). In this case, as shown in FIG. 4(b), the folded label L is opened in an approximate tubular shape. When the label L is opened in this manner, the sucking rods 60 are lowered, to fit the label L on the body of the bottle B positioned immediately below the fitting head 9 (refer to FIG. 3(h)). Then, similar processes are repeated, to sequentially execute fitting of the label L on the bottle B.

Figure 5:
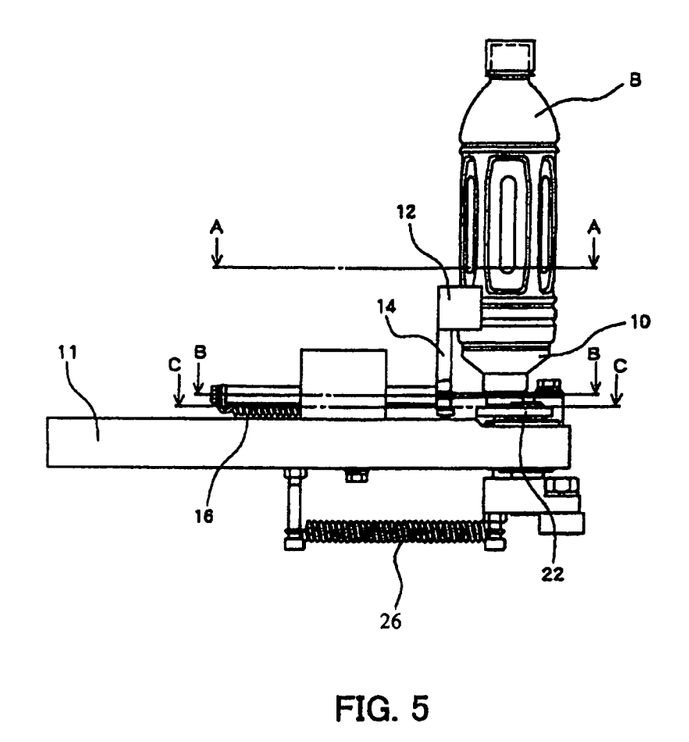
FIG. 5 is a side view of the vicinity of a mount.
Figure 6:
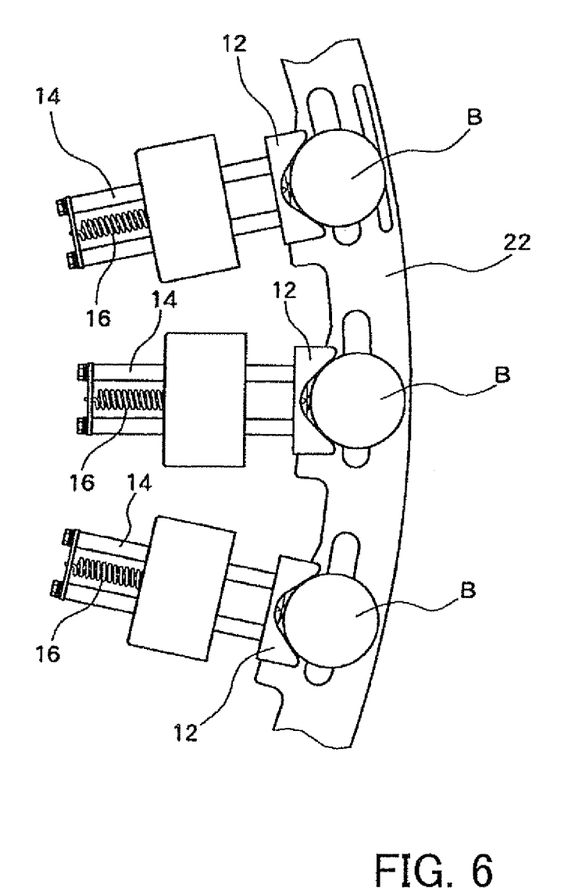
FIG. 6 is a cross sectional diagram taken about a line A-A in FIG. 5.
Figure 7:
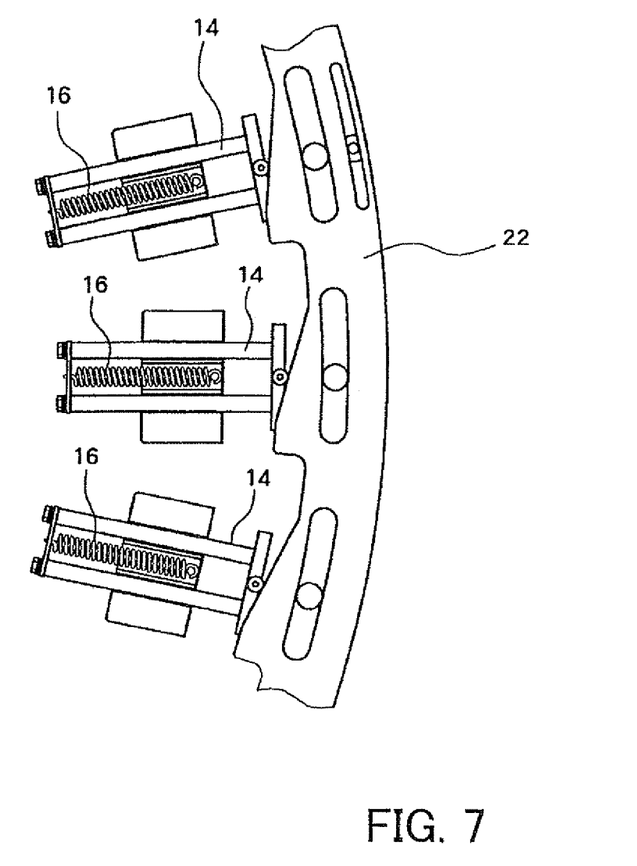
FIG. 7 is a cross sectional diagram taken about a line B-B in FIG. 5.
Figure 8:
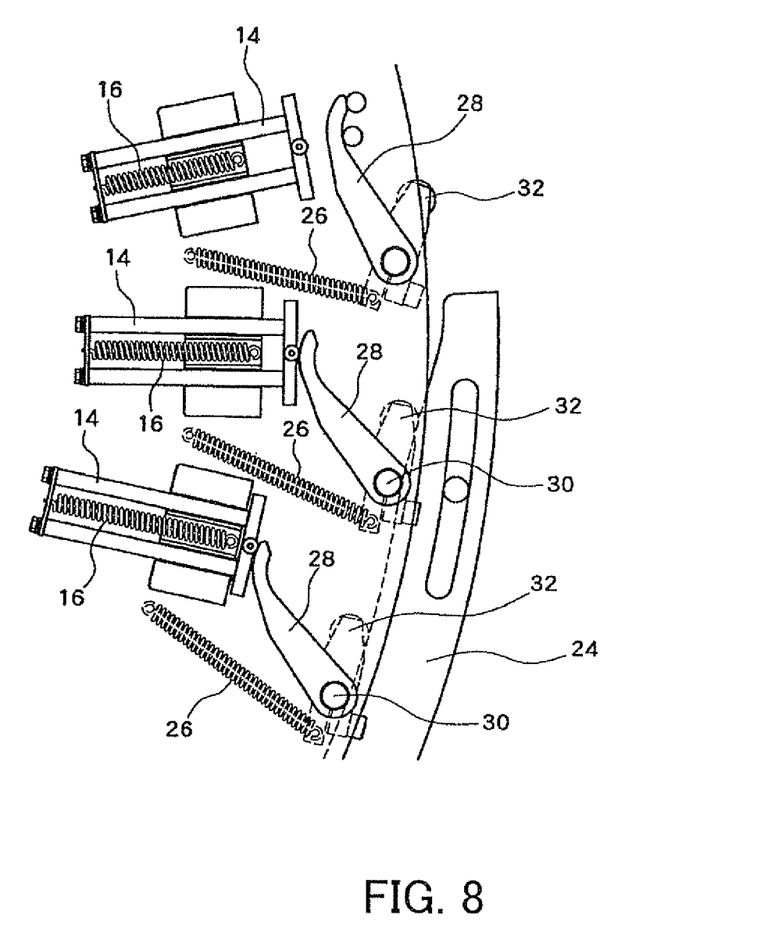
FIG. 8 is a cross sectional diagram taken about a line C-C in FIG. 5.

Next, the bottle transporting device 6 which transports the bottle B in a linked manner with the fitting head 9 will be described in detail with reference to FIGS. 1, 2, and 5-8. FIG. 5 is a side view around the mount 10, and FIGS. 6-8 are cross sectional diagrams along a line A-A, a line B-B, and a line C-C in FIG. 5, respectively.

The bottle transporting device 6 is a device which transports the bottle B supplied from the bottle supplying device 2 at the supplying position α, via the fitting position γ, to the sending position δ, and delivers the bottle B to the bottle sending device 5. The bottle transporting device 6 has a turntable 11, a plurality of mounts 10, a positioning mechanism, etc. The turntable 11 is a table which rotates about a rotational axis O. With the rotation of the turntable 11, the mount 10 placed on the turntable 11 and the fitting head 9 are rotated and moved in a linked manner.

The mount 10 is a base on which a bottle B to be transported is placed. On the turntable 11, a plurality of mounts 10 are provided in a circular shape. The spacing of placement of the mounts 10 is equal to the spacing of placement of the fitting heads 9, and, immediately above each mount 10, a corresponding fitting head 9 is present. The fitting head 9 and the mount 10 rotate and move with the rotation of the turntable 11 in a linked manner; that is, while the relative positional relationship is maintained.

As is clear from FIG. 5, each mount 10 has a shape such that a cylindrical pillar is connected to the bottom of an approximate circular truncated cone-shaped base whose diameter increases toward the upper direction, similar to a cocktail glass. On the upper surface of the mount 10, a sucking hole is formed, and the bottle B is sucked through the sucking hole, to prevent unintentional dropping or the like of the bottle B. In addition, the upper surface of the mount 10 is approximately the same size as or slightly smaller than the bottom surface of the bottle. With such a size, even when the sucking rods 60 provided on the fitting device 4 are lowered to a position lower than the bottom surface of the bottle, no interference between the sucking rods 60 and the mount 10 is caused. With this configuration, the label L can be moved to a position near the bottom surface of the bottle B, and, consequently, the bottle B can be covered with the tubular film to a position near the bottom of the bottle B.

The positioning mechanism can be primarily divided into a positioning block 12, and a moving mechanism which moves the positioning block 12. The positioning block 12 is a member which controls a position of the bottle B on the mount 10. The positioning block 12 is provided for each mount 10, and is configured to be rotated and moved with the mount 10. As shown in FIG. 5, the positioning block 12 is provided on an upper side in relation to the mount 10, and is configured to be able to contact the body of the bottle B placed on the mount 10. In addition, a surface of the positioning block 12 opposing the bottle B is cut out in an approximate V shape, and, even with variation of the type of the bottle B (an outer appearance (such as a polygon) or a size of the body), the positioning block 12 can reliably contact the bottle B. When the bottle B is placed on the mount 10 (that is, when the bottle B is received from the star wheel 20 of the bottle supplying device 2), a part of the bottle B is pushed against the positioning block 12 to achieve the contact, so that the position of the bottle B with respect to the mount 10 is appropriately defined. With this process, the position of the bottle B with respect to the fitting head 9 is also appropriately defined, and there can be prevented problems such as interference between the sucking rods 60 or the label L and the bottle B.

The positioning block 12 can be moved in a direction to move away from or closer to the bottle B; more specifically, in the radial direction of the turntable 11, by the moving mechanism. More specifically, the moving mechanism places the positioning block 12 at a reference position where the bottle B can be positioned (where the positioning block 12 can contact the bottle B) in a contact range E1 including the supplying position α. The moving mechanism also places the positioning block 12 at a retracted position separated from the bottle B in a separation range E2 including the fitting position γ.

Various configurations may be considered as the configuration of the moving mechanism. In the present embodiment, the moving mechanism is configured with a connecting frame 14, springs 16 and 26, a movable lever 28, a stopping bar 22, a pressing bar 24, etc. Of these elements, the connecting frame 14, the springs 16 and 26, and the movable lever 28 are provided for each mount 10. On the other hand, the stopping bar 22 and the pressing bar 24 are each provided in a number of one for the bottle transporting device 6.

More specifically, the positioning block 12 is connected to the connecting frame 14 having an approximate L shape as viewed from the side. The connecting frame 14 (and consequently, the positioning block 12) is biased in a direction to move close to the bottle B (outer side in the radial direction) by the first coil spring 16. The movable lever 28 is a lever which presses or releases the pressing on the connecting frame 14, and is rotatable about an oscillation axis 30. With the rotation, the movable lever 28 is switched between a pressing orientation where the connecting frame 14 is pressed in the retracting direction (an orientation of two movable levers 28 at the lower side of FIG. 8) and a release orientation in which the pressing on the connecting frame 14 is released (orientation of one movable lever 28 at an upper side of FIG. 8).

The second coil spring 26 and a contact piece 32 are connected to the other end of the movable lever 28 (an end which does not contact the connecting frame 14). The second coil spring 26 is a spring which biases the movable lever 28 in a release orientation direction. The contact piece 32 is a member which contacts the pressing bar 24 of the turntable 11, to oscillate the movable lever 28 in the pressing orientation direction against the biasing force of the second coil spring 26.

The pressing bar 24 is a member having an approximate arc shape as viewed from the top and which is placed to contact the contact piece 32 in a separation range E2. The contact piece 32 contacts an end surface of the pressing bar 24 and is pressed, so that the movable lever 28 is set in the pressing orientation, and, consequently, the positioning block 12 is placed in the separated position. On the other hand, the pressing bar 24 has a break in the contact range E1. Because of this, in the contact range E1, the movable lever 28 is set in the releasing orientation due to the biasing force of the second coil spring 26. As the movable lever 28 is set to the releasing orientation, the connecting frame 14 is moved in a direction to come close to the bottle B (outer side in the radial direction) by the biasing force of the first coil spring 16. In this process, the stopping bar 22 controls the position of the connecting frame 14 so that the connecting frame 14 is not moved excessively.

The stopping bar 22 is a bar having an approximate ring shape and which surrounds all of the plurality of connecting frames arranged in a circular shape, and contacts a part of the connecting frame 14 which moves by the biasing force of the first coil spring 16, to block further movement of the connecting frame 14 (refer to FIG. 7). With the contact of the connecting frame 14 and the stopping bar 22, the position of the positioning block 12 in the contact range, and, consequently, the position of the bottle B, is appropriately defined.

The inner peripheral shape of the stopping bar 22; that is, the shape of the contacting portion with the connecting frame 14, is set as an approximate sawtooth wave shape in which triangles are lined. Such a shape is employed in order to easily handle bottles B of different sizes. More specifically, when the size (diameter) of the bottle B differs, the position of the positioning block 12 in the contact range E1; that is, in the reference position, must also be changed. In order to change the reference position, the contact position between the connecting frame 14 and the stopping bar 22 must be changed. However, replacement of the stopping bar 22 itself every time the type of the bottle B is changed is not only complicated, but also causes an increase in cost. On the other hand, with the configuration of the present embodiment where the inner peripheral shape of the stopping bar 22 is set as an approximate sawtooth wave shape, the contact position between the connecting frame 14 and the stopping bar 22 can be changed by merely rotationally moving the stopping bar 22 in the circumferential direction. In the present embodiment, the approximate sawtooth wave shape in which triangles are lined is employed, but the shape may alternatively be a shape in which the contact position is changed by being moved in the circumferential direction such as, for example, a wave shape in which arcs are lined. In addition, in the present embodiment, one stopping bar 22 is provided for the whole bottle transporting device, but alternatively, the stopping bar may be provided for each mount or for each group of a plurality of mounts.

As is clear from the above description, in the present embodiment, the position of the bottle B with respect to the mount 10 is defined by the positioning block 12 which can be moved forward and backward. A reason for the use of such a positioning block 12 which can be moved forward and backward is as follows. As already described, when the position of the bottle B on the mount 10 is inappropriate, the relative positional relationship between the bottle B and the fitting head 9 is also inappropriate, and there is a possibility that interference is caused between the sucking rod 60 or the label L and the bottle B. Therefore, in the related art, the position of the bottle B on the mount is controlled by means of a clamp mechanism which clamps the bottle B, a positioning recess formed on an upper surface of the mount, or the like. However, the clamp mechanism has a complex structure, and there has been a problem in that the clamp mechanism would result in an increase in the cost or the size of the device. In the technique of forming the recess, of a shape corresponding to the bottom surface of the bottle B, on the upper surface of the mount, the structure can be easily realized at relatively low cost. However, in order to form such a positioning recess, the mount must have a larger area than the bottom of the bottle B. In this case, there has been a problem in that, when the sucking rod is to be lowered to a position lower than the bottom surface of the bottle, the sucking rod and the mount would interfere with each other. In this case, there has been a problem in that the label L held on the sucking rod cannot be lowered to a position near the bottom surface of the bottle B, and, as a consequence, the bottle B cannot be covered with the label L to a position near the lower end of the bottle B. Even if the sucking rod can be lowered to a position lower than the bottom surface of the bottle B, because the position near the bottom of the bottle B is stored in the positioning recess and is hidden, the bottle B cannot be covered with the label L at the position near the bottom. In addition, such a positioning recess has a shape corresponding to the shape of the bottom surface of the bottle B. In other words, the positioning recess formed to correspond to a particular bottle B cannot be used for a bottle B of a different shape, and, thus, there has been a problem in that the level of versatility is low.

In the bottle transporting device 6 of the present embodiment, on the other hand, as already described, the mount 10 is set at a size which is the same as or slightly smaller than the bottom surface of the bottle B. Because of this, the mount 10 does not block the lowering of the sucking rod 60. In addition, the positioning block 12 which controls the position of the bottle B is separated from the bottle B around the fitting position γ where the sucking rod 60 is lowered. Because of this, the positioning block 12 does not block the lowering of the sucking rod 60, and the label L can be lowered to a position near the bottom surface of the bottle B. On the other hand, because the positioning block 12 is placed at the reference position where the bottle can be positioned around the supplying position α, the position of the bottle B with respect to the mount 10 is also appropriately controlled.

In addition, as is clear from the above description, the moving mechanism of the present embodiment has a structure to move the positioning block 12 in a mechanical contact relationship. Because of this, the structure of the present embodiment, can be realized easily and at lower cost as compared with a clamp mechanism or the like.

Moreover, according to the structure of the present embodiment, there is an advantage that bottles B of different sizes can be handled by merely variably adjusting the position of the pressing bar 24. Specifically, the positioning block 12 of the present embodiment is cut out in an approximate V shape, and can be contacted with bottles B of different sizes. In addition, the stopping bar 22 which defines the stopping position of the positioning block 12 (reference position) has an approximate sawtooth waveform shape, and the stopping positions of all of the plurality of positioning blocks 12 can be changed by merely rotationally moving the stopping bar 22. As a result, bottles B of different sizes can be handled very easily.

The structure described herein is exemplary, and, so long as the positioning block 12 contacts a part of the bottle B at least at the supplying position α and is separated from the bottle B at least at the fitting position γ, the other structures may differ from those described herein.

EXPLANATION OF REFERENCE NUMERALS

1 FILM FITTING SYSTEM; 2 BOTTLE SUPPLYING DEVICE; 2a SCREW; 2b BELT CONVEYER; 2c STAR WHEEL; 3 LABEL SUPPLYING DEVICE; 4 FITTING DEVICE; 5 BOTTLE SENDING DEVICE; 6 BOTTLE TRANSPORTING DEVICE; 9 FITTING HEAD; 10 MOUNT; 11 TURNTABLE; 12 POSITIONING BLOCK (POSITIONING MEMBER); 14 CONNECTING FRAME; 16 FIRST COIL SPRING (FIRST ELASTIC ELEMENT); 22 STOPPING BAR (STOPPING MEMBER); 24 PRESSING BAR (PRESSING MEMBER); 26 SECOND COIL SPRING (SECOND ELASTIC ELEMENT); 28 MOVABLE LEVER; 30 OSCILLATION AXIS; 32 CONTACT PIECE; 40 TAKE-UP MEMBER; 50 LABEL OPENER; 58, 59 ARM; 60 SUCKING ROD

The invention claimed is:

1. A film fitting system which fits a tubular film on a fitting target, comprising:
   a fitting device which fits, at a predefined fitting position, the tubular film on the fitting target which is transported; and
   a transporting device which receives the fitting target at a predefined supplying position, and then transports the fitting target via the fitting position to a sending position where the fitting target is discharged from the transporting device, wherein
   the transporting device comprises:
   a plurality of mounts which are moved in a state where the fitting target is placed thereon, to move the fitting target from the supplying position via the fitting position to the sending position;
   positioning members which are provided, one for each mount and linked with the corresponding mount and which are moved with the corresponding mount and which position the fitting target with respect to the mount by pushing the positioning member against and contacting the fitting target; and
   a moving device which moves the positioning member to a reference position where the fitting target can be positioned at the supplying position, and moves the positioning member to a retracted position where the positioning member is separated from the fitting target at the fitting position,
   wherein the moving device comprises:
   a first elastic element which biases the positioning member in a direction toward the reference position;
   a stopping member, which directly or indirectly through a connecting frame contacts the positioning member, to stop the positioning member at the reference position;
   a movable lever which can oscillate between a position in which the movable lever contacts the connecting frame and a position where the moveable lever does not contact the connecting frame;
   a pressing member which causes the movable lever to press the positioning member through the connecting frame against the biasing force of the first elastic element and in a direction toward the retracted position; and
   a second elastic element which biases the movable lever in a direction to release the pressing of the movable lever against the positioning member through the connecting frame when the pressing by the pressing member is released,
   wherein the pressing member presses the movable lever at the fitting position, and releases the pressing of the movable lever positioned at the supplying position.

2. The film fitting system according to claim 1, further comprising:
   a reference position changing unit which changes the reference position according to a type of the fitting target to be transported.

3. The film fitting system according to claim 1, wherein a surface, of the positioning member, opposing the fitting target has an approximate V shape.

4. The film fitting system according to claim 1, wherein the fitting device comprises a plurality of sucking members including at least two opposing sucking members configured to suck and hold two opposing outer surfaces of the tubular film folded in a band shape, and
   the fitting device is configured to move the opposing sucking members of the plurality of sucking members away from each other to open the tubular film, and lower the sucking members in this state to fit the tubular film on the fitting target, such that a position where interference between the positioning member and the fitting device which is being lowered can be avoided.

5. The film fitting system according to claim 1, further comprising:
   a reference position changing unit which changes the reference position by adjusting a position of the stopping member.

6. The film fitting system according to claim 1, wherein the plurality of mounts are placed in a predetermined direction;
   the retracted position is separated from the reference position by a distance in a direction perpendicular to a tangential line of the predetermined direction in which the mounts are placed; and
   the moving device is configured to move the positioning member back and forth in the direction perpendicular to the tangential line of the predetermined direction in which the mounts are placed.

* * * * *